(12) United States Patent
Kauffman et al.

(10) Patent No.: US 7,637,766 B2
(45) Date of Patent: Dec. 29, 2009

(54) PHOTOCONTROL RECEPTACLE

(75) Inventors: Rick Kauffman, Buford, GA (US); Jason Cook, Laurel, MS (US); Gerald Ballard, Brandon, MS (US); William E. Lee, Hattiesburg, MS (US)

(73) Assignee: Howard Industries, Inc., Laurel, MS (US)

( * ) Notice: Subject to any disclaimer, the term of this patent is extended or adjusted under 35 U.S.C. 154(b) by 0 days.

(21) Appl. No.: 12/284,352

(22) Filed: Sep. 19, 2008

(65) Prior Publication Data

US 2009/0088021 A1    Apr. 2, 2009

Related U.S. Application Data

(60) Provisional application No. 60/994,756, filed on Sep. 21, 2007.

(51) Int. Cl.
*H01R 4/50* (2006.01)
(52) U.S. Cl. .................................. 439/337; 439/954
(58) Field of Classification Search ................ 439/337, 439/673, 674, 954
See application file for complete search history.

(56) References Cited

U.S. PATENT DOCUMENTS

| | | | |
|---|---|---|---|
| 903,768 A * | 11/1908 | Platt | 439/551 |
| 2,970,222 A | 1/1961 | Husby et al. | |
| 3,297,864 A | 1/1967 | Waldenbauer | |
| 3,343,852 A | 9/1967 | Blight et al. | |
| 3,379,892 A | 4/1968 | Neagle | |
| 3,408,501 A | 10/1968 | Thompson | |
| 3,710,130 A | 1/1973 | Pate | |
| 4,477,143 A * | 10/1984 | Taylor | 439/559 |
| 4,653,834 A | 3/1987 | Norden | |
| 5,593,318 A | 1/1997 | Bilson et al. | |
| 6,059,427 A | 5/2000 | Wedell et al. | |
| 7,189,095 B1 * | 3/2007 | Tseng | 439/337 |
| 7,494,374 B2 * | 2/2009 | Hall et al. | 439/564 |

* cited by examiner

*Primary Examiner*—Thanh-Tam T Le
(74) *Attorney, Agent, or Firm*—Hoffman & Baron, LLP

(57) ABSTRACT

A receptacle assembly for a twist-lock photocontrol that is mounted on a luminaire housing. The assembly includes a receptacle and a spring clamp. The receptacle has a disc portion with a hub extending from the central portion of the back side, a perimeter side wall with a castellated bottom edge that engages stops on the luminaire housing. Three fingers extend from the back side of the disc and terminate at a lip edge. The spring clamp has a substantially flat, ring-shaped body that includes a top surface, an opening, an inner edge, an outer edge, and at least one pair of spring members. The receptacle is attached to a luminaire housing using the spring clamp. The orientation of the receptacle can be adjusted and can be locked into a stationary position without tools.

20 Claims, 9 Drawing Sheets

PHOTOCONTROL RECEPTACLE

This application claims priority from provisional application Ser. No. 60/994,756, filed on Sep. 21, 2007, which is incorporated herein in its entirety.

FIELD OF INVENTION

The present invention relates to accessories for luminaires used for outdoor lighting. In particular, the application relates to receptacles for devices that automatically control luminaires.

BACKGROUND OF THE INVENTION

Twist-lock photoelectric controllers (referred to herein as a "photocontrol" or a "photocontroller") are commonly used to automatically switch luminaires on at dusk and off at dawn. These luminaires are typically used to light roadways, parking lots and other large outdoor areas. These devices sense the intensity of the ambient light and switch the luminaires on and off accordingly. For best performance, the manufacturers of these devices recommend that the user orient the photocontroller so that the cell faces in the direction of North, away from direct sunlight. The manufacturers also require a receptacle that can be easily adjusted to provide the desired orientation.

Street lighting luminaries are typically provided with an electrical receptacle for receiving a photoelectric controller on the luminaire housing. The receptacle, which is mounted on the top of the housing, is electrically wired into the power supply to the luminaire. A photoelectric controller is plugged into the receptacle to provide photoelectric control of the luminaire. The controller has three prongs which are inserted into corresponding openings in the receptacle by applying downward pressure on the controller. After the prongs are completely inserted, the controller is rotated to lock it in place.

After insertion in the receptacle, photoelectric controllers are preferably orientated in a northerly direction (in the northern hemisphere and a southerly direction in the southern hemisphere) to optimize the operation of the photoelectric cell. In one known receptacle, orientation is achieved by loosening a screw in the top of the receptacle, rotating the receptacle until an arrow or other indicia is aimed generally toward North, and then re-tightening the screw. Another receptacle design resiliently attaches the receptacle to the housing surface using a snap ring. By lifting the receptacle, keying pins and recesses in the receptacle and housing are disengaged and the receptacle may be turned to a different orientation.

Within the American National Standards Institute (ANSI), there is a committee, C136, which publishes standards defining some of the mechanical and electrical requirements for different types of lighting equipment, including photocontroller receptacles. The relevant standard relating to the present invention is C136.10-2006, titled "American National Standard for Roadway and Area Lighting Equipment—Locking-type Photocontrol and Mating Devices—Physical and Electrical Interchangeability and Testing." Photocontroller receptacles sold in the United States are required to comply with this standard.

The twist-lock photocontrollers that are currently used to automatically control luminaires have several disadvantages. Some of the designs require a screw or other fastening device to be loosened before the receptacle can be re-oriented and then the screw has to be re-tightened. Other designs use a spring to secure the receptacle to the luminaire housing but they tend to become loose and water can enter the housing. Therefore, there is a need for a receptacle that can be easily reoriented without using a tool, while still securing the receptacle to the luminaire housing and preventing water from entering.

SUMMARY OF THE INVENTION

The present invention is a receptacle assembly for receiving a twist-lock photocontroller. The receptacle assembly includes a receptacle, a spring clamp and, optionally a sealing ring or rain collar. The receptacle includes a disc portion, a hub, a perimeter side wall and a plurality of fingers. The disc portion has an exterior surface, a back side and a circumferential edge. The hub extends from the central portion of the back side and the side wall extends from the back side along the circumferential edge to a bottom edge. Preferably, the bottom edge of the perimeter side wall is castellated and has a plurality of grooves extending between the front and rear surface of the perimeter side wall. The plurality of fingers extends from the back side between the hub and the side wall and each finger terminates at an end that, preferably, has a lip edge extending away from the hub and towards the side wall. The receptacle preferably has three fingers, which can be flexible and radially located around the hub and separated by substantially equal intervals. The receptacle can also include a tab connected to the side wall and/or the back side of the disc that extends at least partially between the side wall and the hub. This tab contacts a pin on the luminaire housing and limits the rotation of the receptacle to about 360 degrees.

The spring clamp has a substantially flat, ring-shaped body that includes a top surface, an opening, an inner edge, an outer edge, and at least one pair of spring members. The opening is adapted to receive the plurality of fingers to secure the spring clamp to the receptacle. Each spring member is connected to the outer edge of the ring-shaped body in a cantilevered fashion and extends upwardly from the top surface and towards the other spring member of the pair. In preferred embodiments, the spring clamp has one or more members extending inwardly from the inner edge. When the spring clamp is fitted onto the hub of the receptacle, the members engage the sides of the hub and secure the spring clamp in place. In other embodiments that do not have members extending from the inner edge of the spring clamp, the opening in the spring clamp are received by the plurality of fingers and secured in place by the lip edges.

The receptacle is attached to a luminaire housing and its orientation is adjustable without tools and can be locked into a stationary position when released to allow for insertion of a control without rotating. The receptacle is installed in an opening in a luminaire housing by inserting the hub and fingers through the opening. The fingers are flexed inwardly to allow the lip edges on the ends of the fingers to pass through the opening. Once inserted in the luminaire housing, the fingers flex back to their normal position and the lip edges contact the underside of the housing. The spring clamp is then attached to the receptacle from the inside of the luminaire so that the interior wall surface is compressively engaged by the spring members of the spring clamp. When a sealing ring or rain collar is used, it can be formed as part of the housing or it can be provided separately and installed around the opening on the outside surface of the luminaire housing before the receptacle is installed. When the collar is provided as a separate item, one edge of the cylindrically-shaped sealing collar is secured to the housing using an adhesive-type sealant. After the receptacle is affixed to the luminaire housing, the sealing ring or rain collar is disposed between the interior surface of the perimeter side wall of the receptacle and the hub.

A preferred form of the photocontrol receptacle assembly, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENTS

Figure 1:
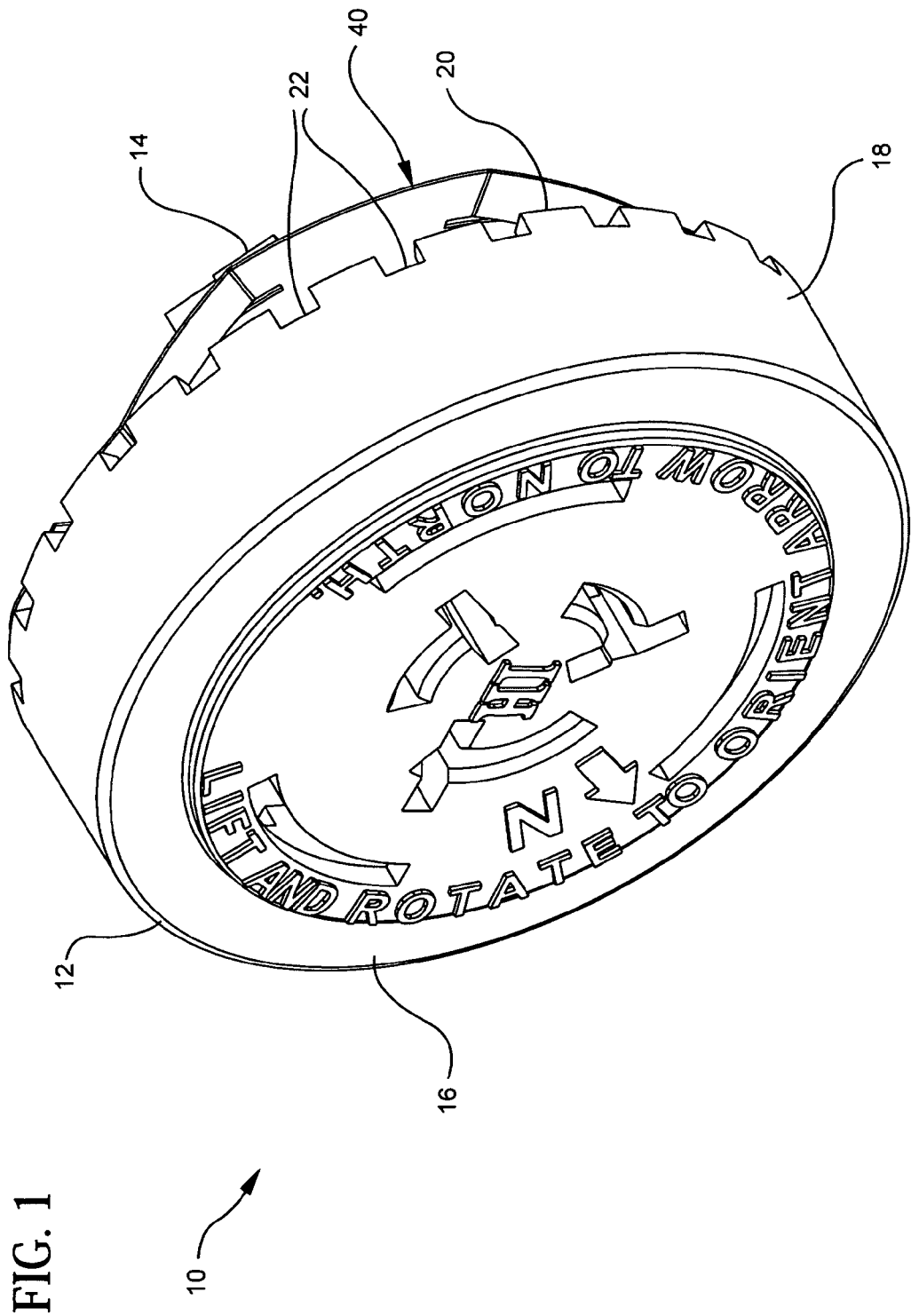
FIG. 1 is a top perspective view of the front of a photocontrol receptacle according to the present invention.

This invention relates to a receptacle assembly for a photocontrol mounted on a luminaire housing. The receptacle portion of the receptacle assembly can be adjusted to orient the photocontrol to North without the use of tools and includes a limit stop which prevents the receptacle from being rotated more than 360 degrees so as to avoid strain on internal the wiring and connections.

The receptacle assembly includes a receptacle and a spring clamp that is used to secure the receptacle to a luminaire housing. The receptacle has a molded body and complies with the ANSI C136.10 standard for roadway lighting equipment. The receptacle has a disc portion with an exterior top surface, a back side and a perimeter side wall that extends from the back side to a bottom edge. The bottom edge of the perimeter side wall has castellated grooves that seat onto one or more square stops on the top of the luminaire detail as discussed in more detail below.

A central hub with a longitudinal axis and a substantially cylindrical outside wall connects to the back side of the disc portion and extends to a back wall. The hub extends beyond the bottom edge of the perimeter side wall and has three buttresses on the outside wall that are parallel to the axis and radially spaced apart. Three passages in the hub extend from the top surface of the disc to the back wall. These passages receive the male connectors (or prongs) for a photocontroller. A plurality of fingers extends from the back side of the disc portion substantially parallel to the outside wall of the hub and between the perimeter side wall and the hub. There are preferably three fingers which extend beyond the bottom edge of the side wall but do not extend past the back wall of the hub. The ends of the fingers have a lip edge that extends orthogonally outwardly and away from the hub. Preferably, the top surface of each of the lip edges slopes downwardly towards the perimeter side wall to facilitate receiving a spring clamp and/or insertion into the opening in a luminaire housing.

The receptacle is secured to a molded detail in the luminaire housing. As used herein, the term detail refers to the structure formed as part of the luminaire housing that is used for mounting the receptacle. This detail includes an opening, a rim around the opening with a lip extending between the rim and the opening, a pin extending upwardly from the rim and a plurality of stops located on an edge around the outside of the rim. The receptacle is installed in the luminaire housing by passing the hub and fingers through the opening in the housing from the exterior. The fingers are compressed inwardly so that they can pass through the opening and, when the pressure is released, the fingers move outwardly so that the lip edges of the fingers extend beyond edge of the opening in the housing. This prevents the receptacle from being removed from the housing without compressing the fingers inwardly. Preferably, there is sufficient clearance between the lip edges and the interior surface of the housing so that the receptacle can freely move up and down about ¹⁄₁₆ to ½-inch before the spring clamp is attached. The fingers can contact the sides of the opening but they are located so that they do not prevent the receptacle from freely rotating. The spring clamp is attached to the receptacle from the interior side of the housing. In one embodiment, the opening in the spring clamp is received by the fingers and retained in place by the lip edges. In another embodiment, the spring clamp has members extending from the inner edge of the opening and these members engage the outside wall of the hub.

When the receptacle is installed in the luminaire housing, it is secured to the housing by the plurality of fingers and the spring clamp. The bottom castellated edge of the perimeter side wall of the receptacle contacts the exterior surface of the luminaire housing on the outside of the rim around the opening in the housing. One or more of the plurality of grooves in the castellated bottom edge engage the stops on the housing. These grooves, together with the compressive force of the spring clamp, prevent rotation of the receptacle during the insertion and twist-locking action of the photocontrol. The receptacle can be lifted above the top of the stops (about ⅛-inch), by applying an upward force sufficient to overcome the force exerted by the spring clamp, and rotated to re-orient the receptacle and provide alignment of the photocontrol toward North without the use of tools. When the user releases the receptacle, the spring clamp compressively pulls the receptacle back against the stops in the luminaire detail to lock the receptacle in place and prevent rotation. A tab on the underside of the receptacle extends inwardly from the side wall and/or back side of the disc and engages a pin cast into the detail of the luminaire housing to limit the rotation of the receptacle to a maximum of 360 degrees in order to protect wiring and connectors from excessive strain.

As used herein, the terms "luminaire" and "luminaire housing" are used to refer to an electric lighting fixture, wall bracket, portable lamp, or other complete lighting unit designed to contain one or more electric lighting sources and associated reflectors, refractors, housing, and such support for those items as necessary. In particular, the terms refer to lighting fixtures that are used to illuminate roadways, parking lots and other large outdoor areas. However, the terms are not intended to be limiting and can be used to refer to any electric light source that can be controlled by a photocontroller.

The spring clamp has two embodiments. In the first embodiment, the spring clamp is ring-shaped and the opening has a substantially round inner edge which passes over the lip edges on the ends of the fingers and fits snugly against the sides of the fingers. The fingers are pressed inwardly to receive the spring clamp and, when the pressure is released, the lip edges of the fingers engage the inner edge of the spring clamp and lock it onto the receptacle.

In the second embodiment, the spring clamp is ring-shaped and the opening has a plurality of flexible members extending inwardly from the inner edge. These members engage the sides of the hub to secure the spring clamp to the receptacle. The fingers are not inserted in the opening, as in the first embodiment, and the spring clamp is positioned between the end of the hub and the ends of the fingers. When the spring clamp is pushed over the hub, the flexible members move radially outwardly and compressively engage the hub. Once the spring clamp is positioned on the hub, the flexible members resist removal of the spring clamp in a manner similar to a "Chinese finger grip," i.e., the more force applied, the tighter the members grip the sides of the hub.

The receptacle assembly can also be used with a sealing ring or rain collar for preventing water from entering the housing. The rain collar is substantially cylindrically-shaped and has a diameter greater than the diameter of the opening in the luminaire housing and less than the diameter of the rim that circumferentially extends around the opening in the housing. The rain collar is installed on the lip that extends between the rim and the opening before the receptacle is installed. In a preferred embodiment, the rain collar is part of the detail and is formed as part of the luminaire housing. When the rain collar is provided as a separate component, a sealant or adhesive can be used to secure the rain collar to the housing. Preferably, the length of the rain collar is greater than the height of the rim and less than the interior height of the perimeter side wall. The rain collar is preferably made from a metal, such as aluminum, when it is part of the luminaire housing. When the rain collar is provided as a separate item, it is made from a hard rubber or plastic material, but other materials, such as a coated cardboard material, can be used.

Figure 2:
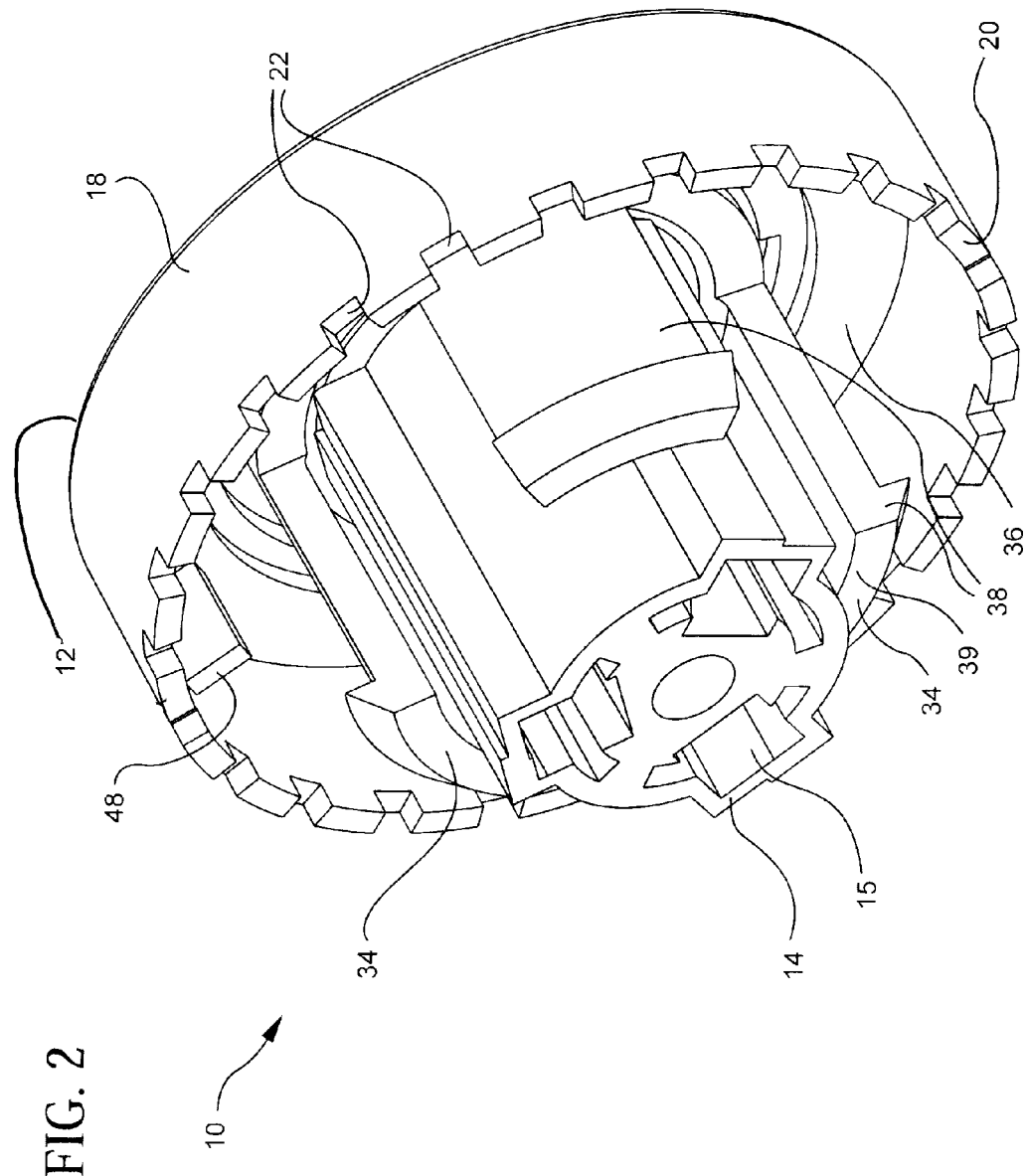
FIG. 2 is a top perspective view of the rear of the photocontrol receptacle shown in FIG. 1 showing the internal details.

Referring first to FIGS. 1 and 2, the photocontrol receptacle 10 is preferably molded from a durable, weather-resistant plastic material and has a generally circular disc portion 12 and a centrally disposed hub portion 14 having one or more passages 15 formed therein for receiving the male connectors (also referred to herein as prongs) of a photocontrol (not shown). In a preferred embodiment, the disc portion 12 of the receptacle 10 has a diameter of about 2 9/16 inches and a height of about 11/16 inches. The overall height of the receptacle 10, including the hub portion is preferably about 1 3/8 inches.

The disc portion 12 includes an exterior face 16 having lettering provided thereon for instructing the user how to orient the receptacle 10 so that the control cell can be oriented to North. As mentioned above, the passages or slots 15 molded into the hub portion 14 of the receptacle 10 are adapted to receive the prongs of the twist-lock photocontrol cell. The back side of the passages 15 in the hub portion 14 can have square openings for receiving connectors (not shown) for wires. These terminals receive the male terminals (i.e., the prongs) of the photocontrol that are inserted in the passages 15. These features are in accordance with the requirements set forth in ANSI C136.10 and are well known to those of ordinary skill in the art.

Extending from the circumferential edge of the disc portion 12 is a perimeter side wall 18 that terminates at a bottom edge 20 opposite the exterior face 16. The bottom edge 20 is castellated with a plurality of grooves 22. The grooves 22 are preferably about 1/8-inch wide and at least about 0.1 inches deep. The grooves 22 can be spaced around the perimeter wall 18 at 5-degree increments to allow for rotational adjustment and orientation of the receptacle 10.

Figure 3:
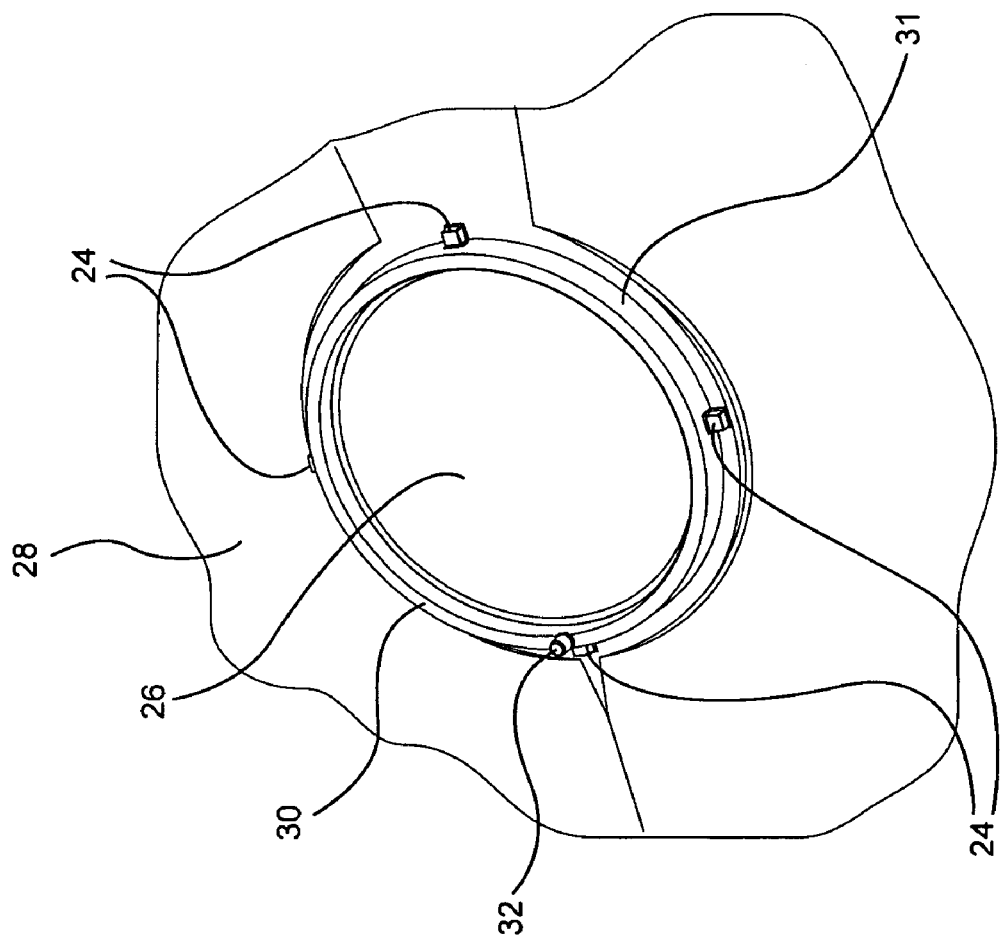
FIG. 3 is a top perspective view of portion of a luminaire housing with a detail cast in the housing for receiving the receptacle shown in FIG. 1.

Referring additionally to FIG. 3, the grooves 22 interface with corresponding male stops 24 provided around a receptacle mounting aperture 26 of a luminaire housing 28. The luminaire housing 28 is further preferably provided with a rim 30 surrounding the aperture 26 to serve as a water stop for rain. A pin 32 is also preferably provided at the edge of the opening 26, the purpose of which will be described in detail below.

The opening 26 of the luminaire housing 28 allows insertion of the hub portion 14 of the receptacle 10 and centers it, whereby the bottom edge 20 of the of the side wall 18 contacts the edge 31 around the opening 26 in the luminaire housing 28. By rotating the receptacle 10 within the aperture 26, the receptacle 10 can be oriented in the proper North-facing direction. Once properly oriented, the grooves 22 provided in the perimeter edge 20 of the disc portion 12 are brought into engagement with the stops 24 provided around the luminaire housing opening 26 to prevent further rotation of the receptacle 10.

Returning to FIG. 2 showing the underside of the receptacle 10, the receptacle 10 has three fingers 34 extending from the back side 36 of the disc portion 12. The fingers 34 radially surround the hub portion 14 and are preferably equally spaced apart. The fingers 34 have a height less than the height of the hub portion 14, but greater than the height of the perimeter side wall 18. The fingers 34 terminate at a lip edge 38, which extends away from the hub and can be adapted to engage a spring clamp 40, as shown in FIG. 4, to secure the receptacle 10 in the luminaire housing 28.

Figure 4:
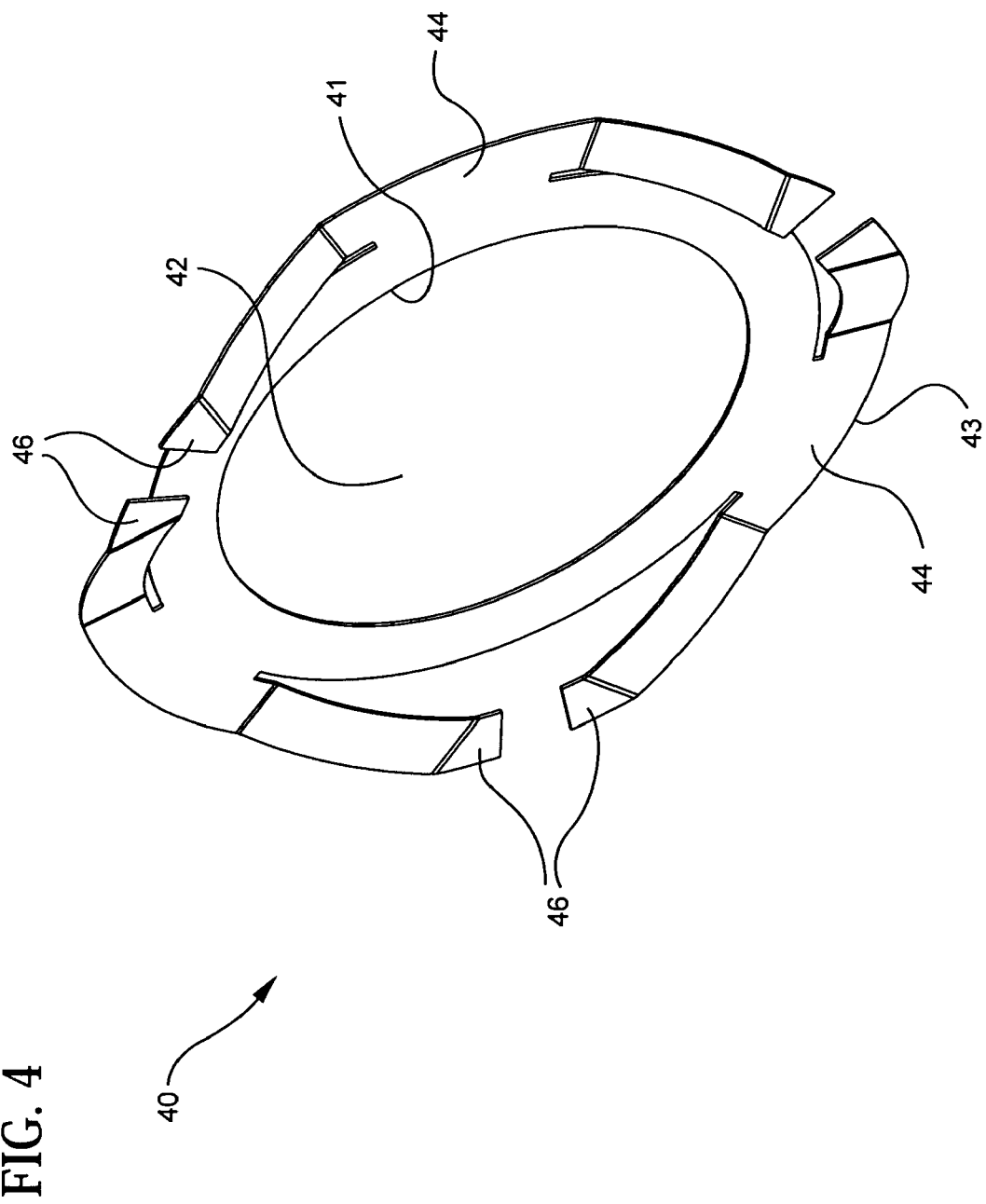
FIG. 4 is a top perspective view of a first embodiment of the spring clamp of the present invention.
Figure 5:
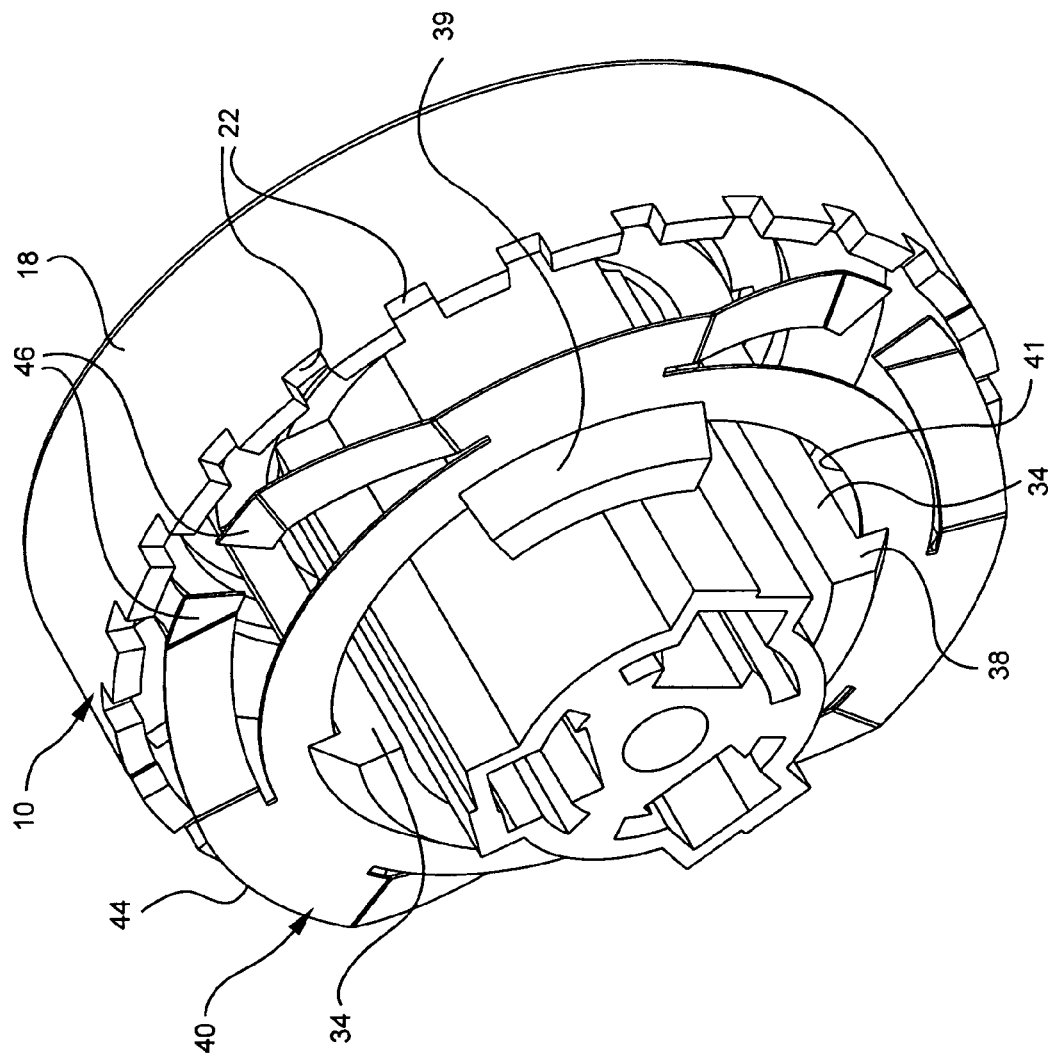
FIG. 5 is a bottom perspective view of the photocontrol receptacle shown in FIGS. 1-3 assembled with the spring clamp shown in FIG. 4.

The first embodiment of the spring clamp 40 shown in FIG. 4 is a washer-like member made from a resilient material, such as spring-steel. The spring clamp 40 has a central opening 42 with an inner diameter sized to receive the three fingers 34 of the receptacle 10 when they are flexed inwardly towards the hub 14. After the spring clamp 40 is installed over the lip edges 38 of the fingers 34, the pressure on the fingers 34 is released and the lip edges 38 contact the inner peripheral edge 41 of the opening 42, as shown in FIG. 5. The flexibility of the fingers 34 permits inward bending, which allows the spring clamp 40 to be easily slipped over and around the fingers 34. The lip edges 38 of the fingers 34 can also be provided with a chamfered face 39 to facilitate insertion of the fingers 34 through the central opening 42 of the spring clamp 40 or through the opening 126 in a luminaire housing (see FIG. 7).

The spring clamp 40 has a ring-shaped, substantially flat body 44 and an inner edge 41 and an outer edge 43. The body 44 has an outer diameter generally matching the outer diameter of the disc portion 12 of the receptacle 10. Provided around the peripheral edge 43 are a plurality of cantilevered spring members 46 extending upwardly from the plane of the spring clamp 40. The spring members 46 are adapted to engage the interior surface of the luminaire housing 28 surrounding the opening 26 in the housing 28 to provide a constant biasing force between the receptacle 10 and the luminaire housing 28.

The receptacle 10 can have an anti-rotation tab 48 connected to the back side 36 of the disc portion 12 and or the interior side of the perimeter side wall 18. The tab 48 engages the pin 32 formed on the peripheral edge of the luminaire housing opening 26 to prevent more than 360 degrees rotation of the receptacle 10 within the luminaire opening 26. This construction minimizes the use of material in the device and provides positive locking for photocontrol insertion.

Figure 6:
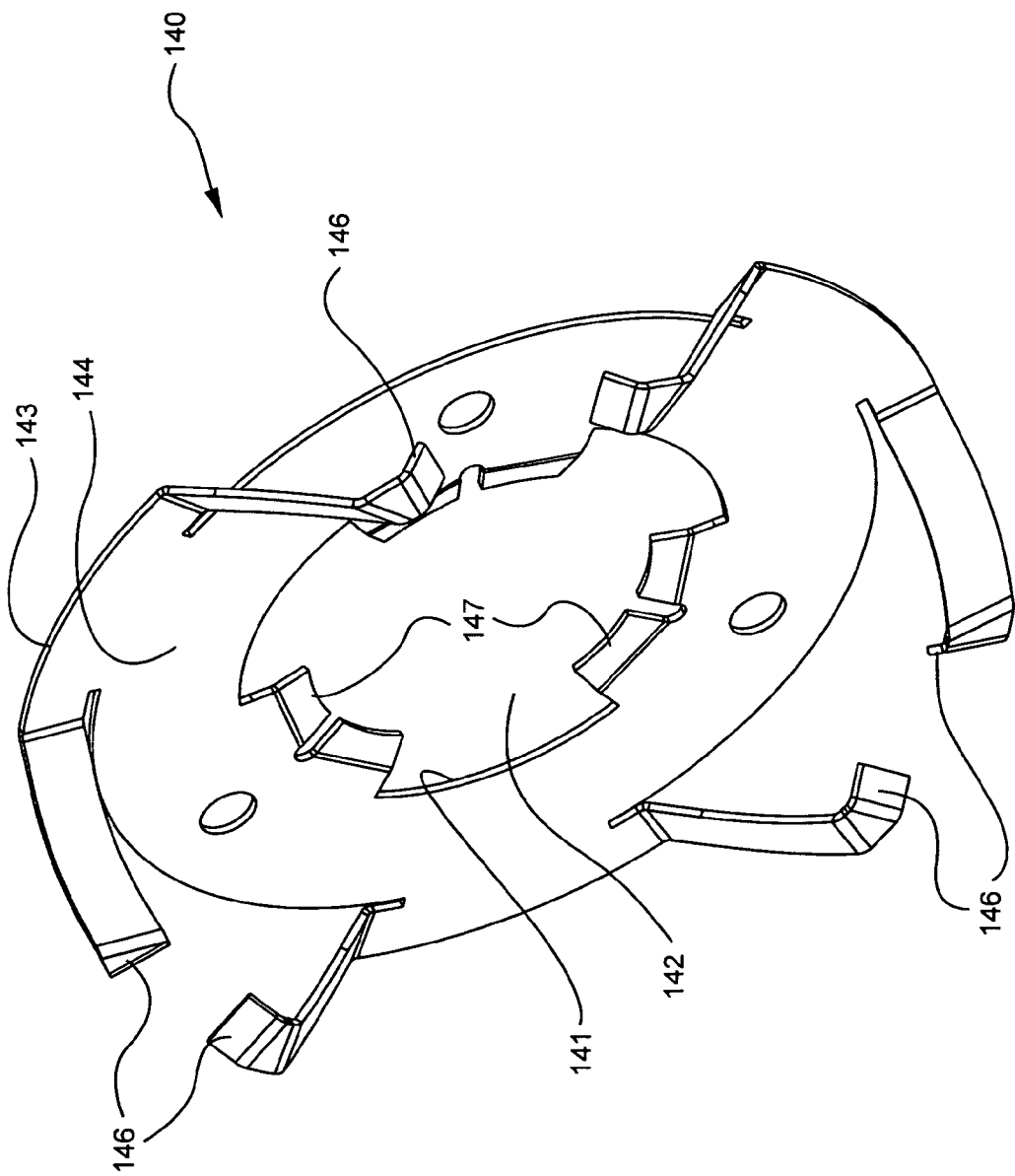
FIG. 6 is a top perspective view of a second embodiment of the spring clamp of the present invention.

FIG. 6 shows a second embodiment of the spring clamp 140, which has a ring-shaped, substantially flat body 144 with a central opening 142 defined by an inner edge 141 and an outer edge 143. The second embodiment of the spring clamp 140 is substantially similar to the first embodiment of the spring clamp 40 except that the inner diameter of the opening 142 is smaller and a plurality of members 147 extend inwardly from the inner peripheral edge 141. In this embodiment, the members 147 engage the sides of the hub 114 (see FIG. 8) to secure the spring clamp 140 to the receptacle 110.

Figure 7:
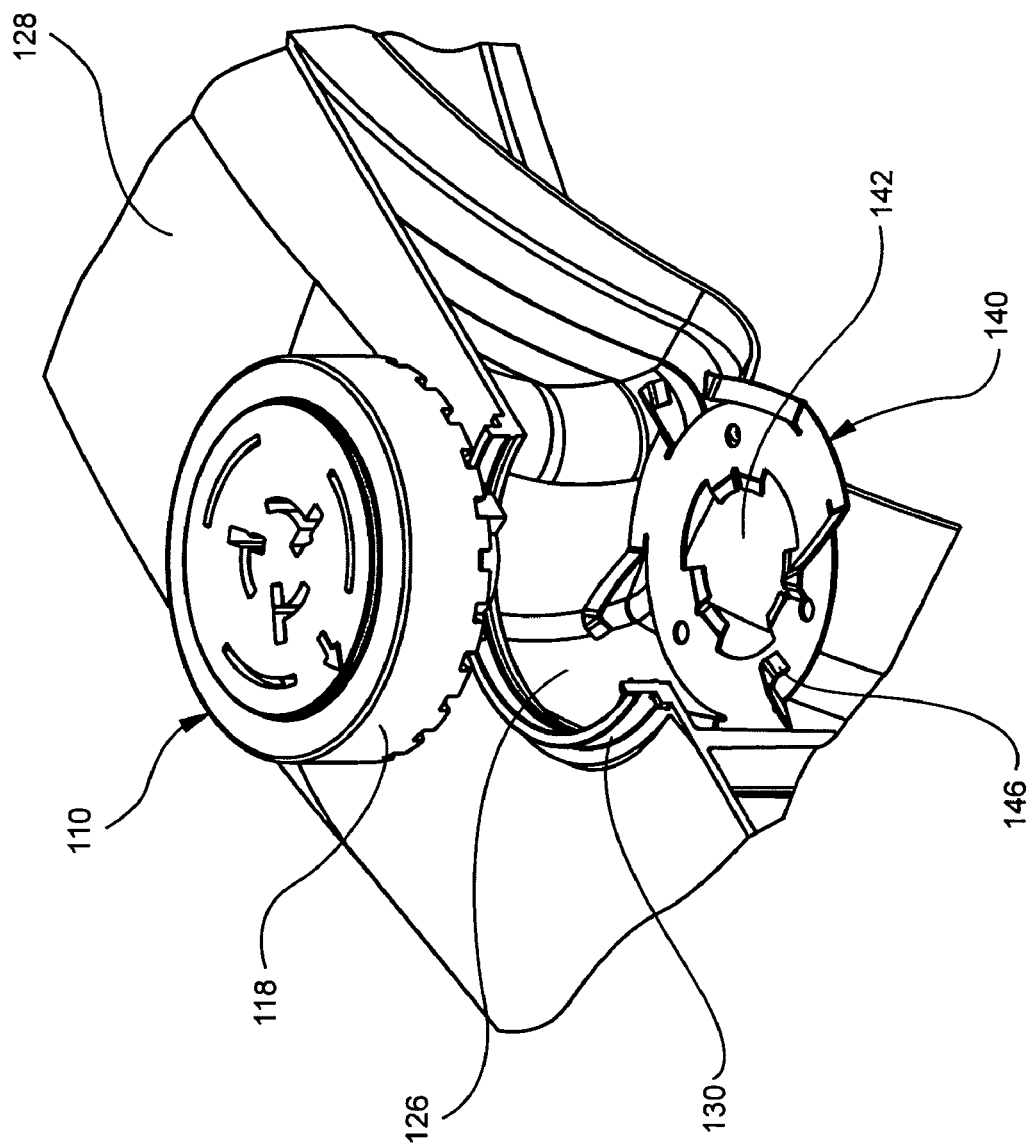
FIG. 7 is a perspective, exploded view of the receptacle of the present invention and the second embodiment of the spring clamp installed in a luminaire housing.

FIG. 7 shows the installation of a receptacle 110 on a luminaire housing 128 using the second embodiment of the spring clamp 140. The luminaire housing 128 has a rim 130 around the opening 126 that receives the perimeter side wall 118 of the receptacle 110. The receptacle 110 is installed from the exterior of the housing 128 and the spring clamp 140 is installed from the interior of the housing 140. The opening 142 in the spring clamp 140 receives the hub 114 (FIG. 8) and the spring members 146 contact the interior surface of the housing 128 after the spring clamp 140 is attached to the receptacle 140.

Figure 8:
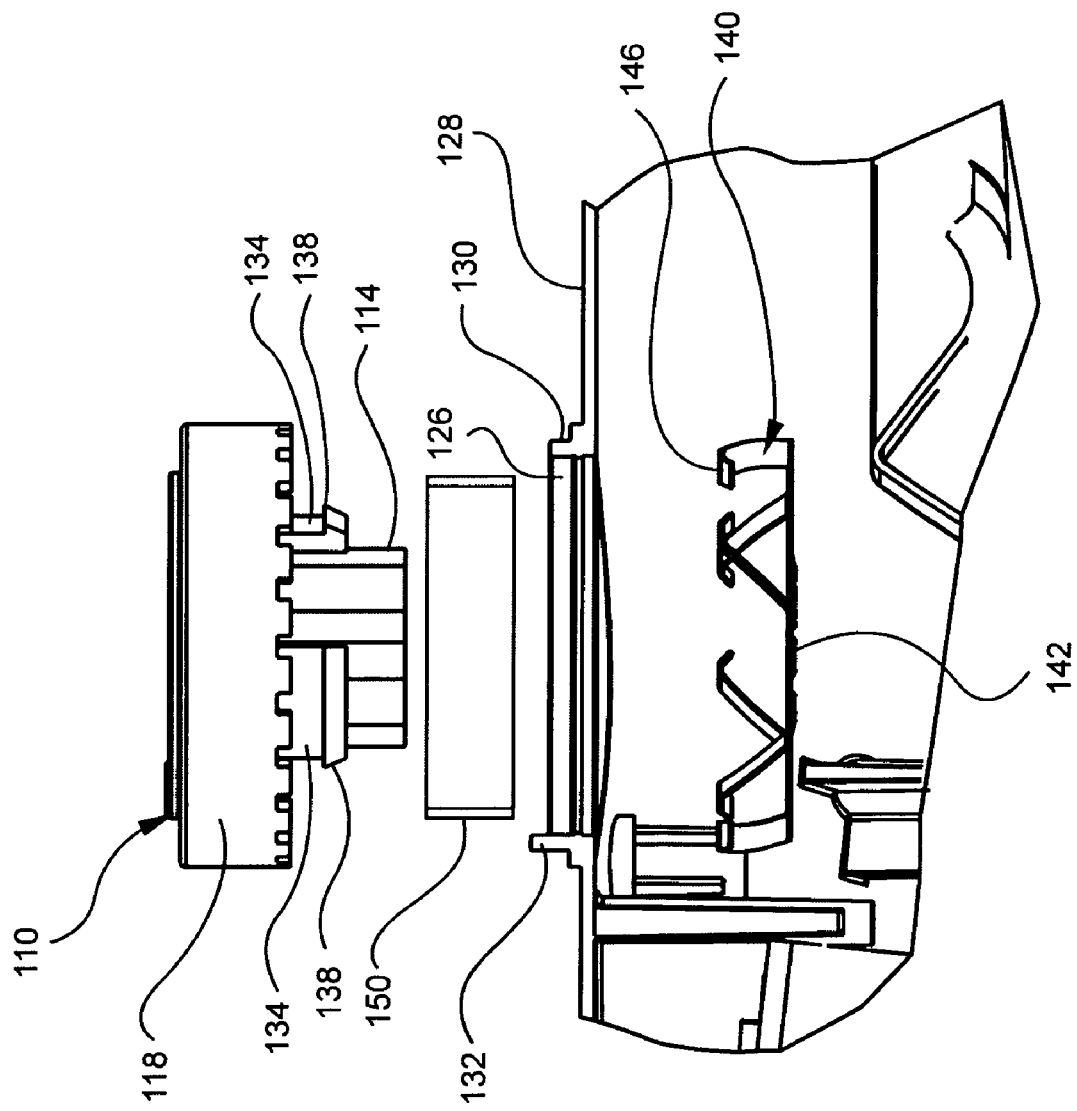
FIG. 8 is a side, exploded view of the receptacle of the present invention and the second embodiment of the spring clamp being installed in a luminaire housing.

FIG. 8 shows a side view of the receptacle 110 in FIG. 7 as it is mounted in a luminaire housing 128. The receptacle 110 is installed in the housing 128 by inserting the hub 114 and fingers 134 through the opening 126 in the top of the housing 128. The fingers 134 are preferably flexible so that they can be pushed inwardly towards the hub 114 to allow the lip edges 138 on the ends of the fingers 134 to pass through the opening 126. Once the lip edges 138 pass through the opening 126, the pressure on the fingers 134 is released and the fingers 134 return to their normal position. The fingers 134 contact the sides of the opening 126 but they do not prevent the receptacle 110 from freely rotating. The lip edges 138 prevent the receptacle 110 from being extracted from the housing 110. The spring clamp 140 is then attached to the receptacle 110 from the inside of the housing 128 by inserting the hub 114 in the opening 142 in the spring clamp 140. When the receptacle 110 is attached to the spring clamp 140, the perimeter side wall 118 fits over the rim 130 around opening 126 in the housing 128 and the spring members 146 on the spring clamp 140 contact the interior surface of the housing 128. A pin 132 extending from the luminaire housing 128 limits the rotation of the receptacle 110 to a maximum of 360 degrees. A rain collar 150 can be positioned inside the rim 130 so that, when the receptacle 110 is installed, the rain collar 150 is between the perimeter side wall 118 and the hub 114 of the receptacle 110.

Figure 9:
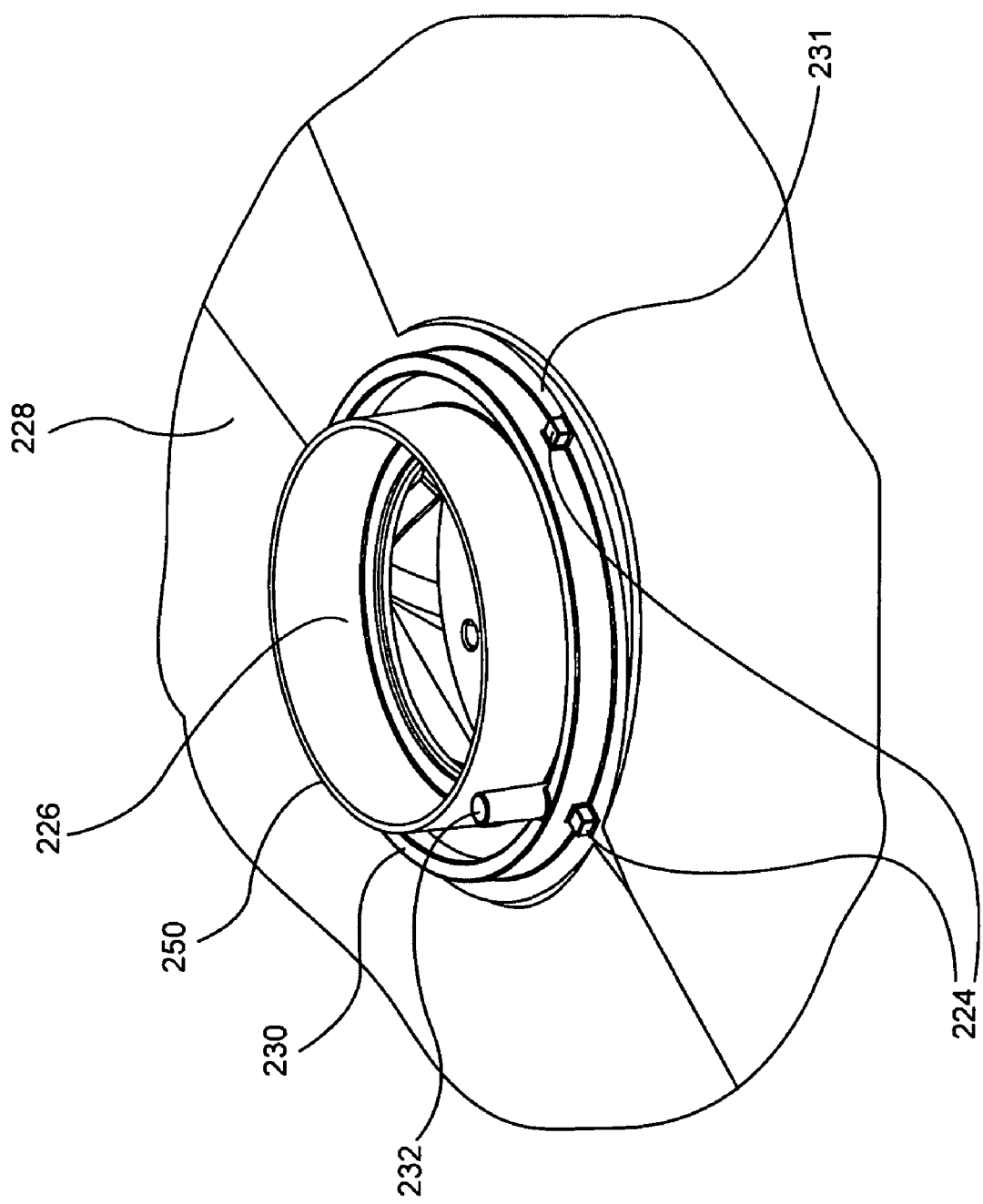
FIG. 9 is a top perspective view of portion of a luminaire housing with a detail with a rain collar cast in the housing for receiving the receptacle shown in FIG. 1.

FIG. 9 shows an embodiment of the luminaire housing 228 that has a rim 230 surrounding the aperture 226, which serves as a water stop for rain. A pin 232 that limits the rotation of the receptacle (not shown) extends from the rim 230. In addition to the rim 230, a rain collar 250 cast into the housing as part of the detail is provided to prevent any water that may pass over the rim 230 from entering the interior of the housing 228. The rain collar 250 is located between the rim 230 and the opening 226 in the housing 228. An edge 231 around the outside of the rim 230 has a plurality of stops 224 that engage the castellated grooves of the receptacle 10 (FIG. 2). The rain collar 250 fits between the perimeter side wall 18 and hub 14 of the receptacle 10 shown in FIG. 2.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A receptacle assembly for receiving a twist-lock photocontrol comprising:

a receptacle comprising a disc portion having an exterior surface, a back side and a circumferential edge, a hub extending from the back side, a perimeter side wall extending from the back side of the circumferential edge to a bottom edge and a plurality of fingers extending from the back side between the hub and the perimeter side wall and terminating at an end; and a spring clamp having a substantially flat, ring-shaped body comprising a top surface, an opening, an inner edge, an outer edge, and at least one pair of spring members, wherein the receptacle is mounted in an opening in a luminaire housing and the orientation of the receptacle is adjustable without tools, and wherein the receptacle can be locked in a stationary position;

wherein the plurality of fingers are not connected to the hub.

2. The receptacle assembly according to claim 1, wherein each spring member in a pair is connected to the outer edge of the ring-shaped body and extends upwardly from the top surface and towards the other spring member in the pair.

3. The receptacle assembly according to claim 1, wherein the fingers are flexible, and wherein the end of each finger has a lip edge extending towards the perimeter side wall.

4. The receptacle assembly according to claim 1, wherein the receptacle further comprises a tab connected to the perimeter side wall or the back side of the disc portion or both the perimeter side wall and the back side of the disc portion, and wherein the tab extends at least partially between the perimeter side wall and the hub.

5. The receptacle assembly according to claim 1, wherein the bottom edge of the perimeter side wall is castellated and has a plurality of grooves, and wherein the grooves are adapted to engage one or more stops on the luminaire housing.

6. The receptacle assembly according to claim 1, wherein the receptacle has three fingers, wherein the three fingers are radially located around the hub and separated by substantially equal intervals.

7. The receptacle assembly according to claim 1, wherein the opening in the spring clamp is adapted to receive the plurality of fingers to secure the spring clamp to the receptacle.

8. The receptacle assembly according to claim 1, wherein a plurality of members extend inwardly from the inner edge of the spring clamp, and wherein the plurality of members engage the hub to secure the spring clamp to the receptacle.

9. The receptacle assembly according to claim 1 further comprising a rain collar disposed between the perimeter side wall and the hub.

10. A receptacle assembly for receiving a twist-lock photocontrol comprising:

a receptacle comprising a disc portion having an exterior surface, a back side and a circumferential edge, a hub extending from the back side and a perimeter side wall extending from the back side along the circumferential edge to a castellated bottom edge with a plurality of grooves, and wherein the grooves in the castellated bottom edge are adapted to engage one or more stops on the luminaire housing; and a spring clamp having a substantially flat, ring-shaped body comprising a top surface, an opening, an inner edge, an outer edge, and at least one pair of spring members, and one or more members extending inwardly from the inner edge, wherein the one or more members is adapted to flexibly engage the hub and secure the spring clamp to the receptacle, wherein the receptacle is mounted in an opening in a luminaire housing and the orientation of the receptacle is adjustable without tools, and wherein the receptacle can be locked in a stationary position;

wherein the receptacle further comprises a plurality of fingers extending from the back side between the hub and the perimeter side wall; and wherein the plurality of fingers are not connected to the hub.

11. The receptacle assembly according to claim 10, wherein each spring member in a pair is connected to the outer edge of the ring-shaped body and extends upwardly from the top surface and towards the other spring member in the pair.

12. The receptacle assembly according to claim 10, wherein the receptacle further comprises a tab connected to the perimeter side wall or the back side of the disc portion or both the perimeter side wall and the back side of the disc portion, and wherein the tab extends at least partially between the perimeter side wall and the hub.

13. The receptacle assembly according to claim 10, wherein the plurality of fingers terminating at an end.

14. The receptacle assembly according to claim 13, wherein the receptacle has three fingers, and wherein the three fingers are radially located around the hub and separated by substantially equal intervals.

15. The receptacle assembly according to claim 10, wherein the spring members of the spring clamp compressively secure the receptacle assembly in a luminaire housing.

16. The receptacle assembly according to claim 10 further comprising a rain collar disposed between the perimeter side wall and the hub.

17. A receptacle assembly for receiving a twist-lock photocontrol comprising:

a receptacle comprising a disc portion having an exterior surface, a back side and a circumferential edge, a hub extending from the back side, a perimeter side wall extending from the back side along the circumferential edge to a castellated bottom edge with a plurality of grooves and three fingers extending from the back side between the hub and the perimeter side wall and terminating at a lip edge, wherein the fingers are radially located around the hub and separated by substantially equal intervals, and wherein the grooves in the castellated bottom edge are adapted to engage one or more stops on the luminaire housing; and a spring clamp having a substantially flat, ring-shaped body comprising a top surface, an opening, an inner edge, an outer edge, and at least one pair of spring members, and wherein a plurality of members extend inwardly from the opening and is adapted to secure the spring clamp to the hub, wherein the receptacle is attached to a luminaire housing and the orientation of the receptacle is adjustable without tools, and wherein the receptacle can be locked in a stationary position;

wherein the three fingers are not connected to the hub.

18. The receptacle assembly according to claim 17, wherein the receptacle further comprises a tab connected to the perimeter side wall or the back side of the disc portion or both the perimeter side wall and the back side of the disc portion, and wherein the tab extends at least partially between the perimeter side wall and the hub.

19. The receptacle assembly according to claim 18, wherein the spring members of the spring clamp compressively secure the receptacle assembly in a luminaire housing.

20. The receptacle assembly according to claim 18 further comprising a rain collar disposed between the perimeter side wall and the hub.

* * * * *